C. P. ROBINSON.
NUT LOCK.
APPLICATION FILED JAN. 9, 1915.
1,180,540.
Patented Apr. 25, 1916.
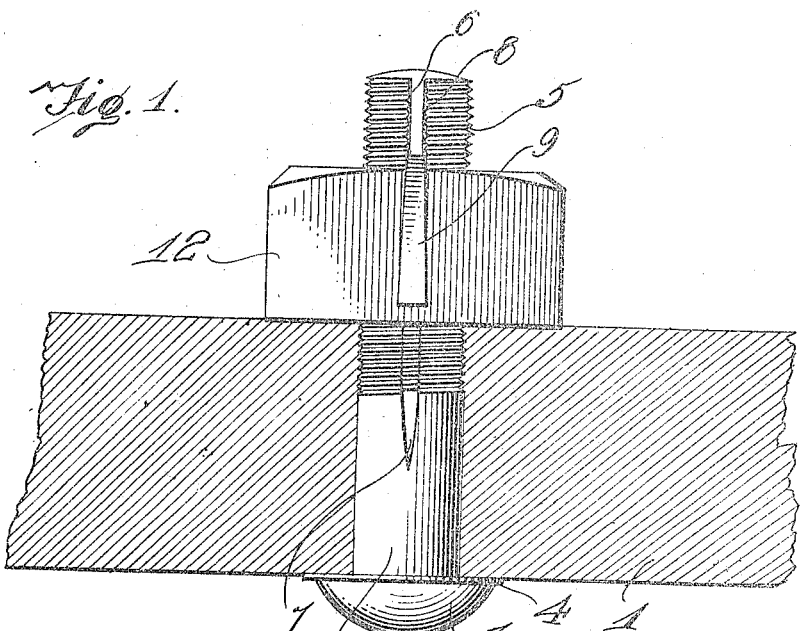
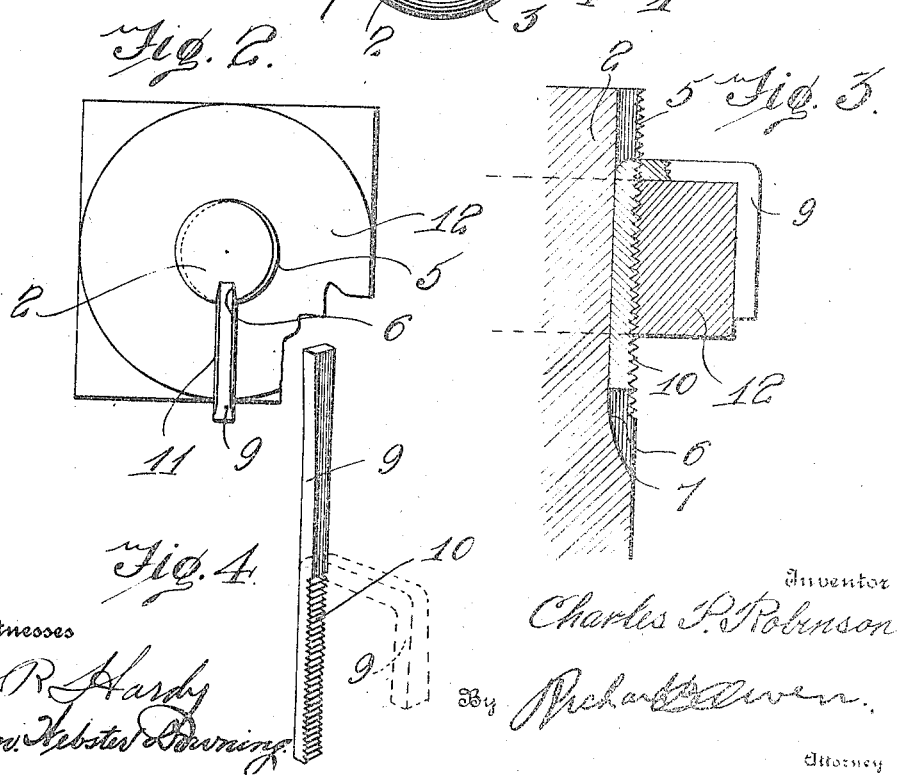
Witnesses
C. R. Hardy
Wm. Webster Browning
Inventor
Charles P. Robinson
By Richard Owen
Attorney

UNITED STATES PATENT OFFICE.

CHARLES P. ROBINSON, OF MAUSTON, WISCONSIN.

NUT-LOCK.

1,180,540.　　　Specification of Letters Patent.　　Patented Apr. 25, 1916.

Application filed January 9, 1915. Serial No. 1,393.

*To all whom it may concern:*

Be it known that I, CHARLES P. ROBINSON, a citizen of the United States, residing at Mauston, in the county of Juneau and State of Wisconsin, have invented certain new and useful Improvements in Nut-Locks, of which the following is a specification.

My invention relates to nut locks.

The primary object of my invention resides in the provision of a novel means associated with the nut and bolt for securely locking the nut at any desired position on the bolt, thus preventing the rotation of the nut on the bolt as well as the accidental displacement of the nut from the bolt.

Another object of my invention resides in the construction of an improved locking means for removable association with both the nut and the bolt, the said locking member being bendable for removably holding the nut in various positions on the bolt.

A further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings: Figure 1 is a side elevational view of a bolt and nut embodying my invention; Fig. 2 is a fragmentary top plan view of the same; Fig. 3 is a fragmentary vertical sectional view of my invention assembled; and Fig. 4 is a perspective view of the locking key forming a part of my invention, the dotted lines illustrating the position assumed by the locking member when in locking engagement with a nut.

Referring more particularly to the drawings in which similar reference numerals designate like or corresponding parts throughout the different views, I provide, for the purpose of illustration, a piece of work 1 through which extends a shank 2 of my improved bolt, the head 3 of which is arranged in spaced relation with one surface of the work 1 by means of a washer 4 disposed about the shank 2. The outer end of the bolt is provided with a plurality of threads 5. The bolt is further provided with a longitudinally extending groove 6 which terminates adjacent the head at a point 7, the sides of said groove being tapered toward the bottom as shown at 8, the groove being for a purpose to be hereinafter described.

In order to securely lock a nut in various adjusted positions on the bolt, I have provided my improved locking key 9 which in this instance consists essentially of an elongated strip of bendable metal substantially square in cross section. The lower outer face of the locking key is provided with a plurality of threads 10 of a pitch similar to the pitch of the threads on the bolt and the sides of the key are arranged slightly slanting as at 11 toward their rear face so that when the key is being inserted in the groove 8 the tapered sides of the key 9 which conform to the configuration of the walls of the groove will frictionally engage said walls and thus maintain the threads on the key in alinement with the threads on the bolt. After the key has been inserted in the groove 8 a nut 12 is screw threaded upon the free end of the bolt and because of the bendable material of which the key is formed, by the use of a hammer or like tool, the key is bent downwardly and arranged in abutting relation with the top and adjacent side surfaces of the nut assuming a substantially U-shaped configuration. Because of the arrangement of the threads on the key, when the nut is in engagement with the bolt and also the threads on the key, it is impossible for the key to slide longitudinally in the groove and it can be easily seen that when the key is bent in the manner described, rotary movement of the nut on the bolt is absolutely prevented, that is as far as accidental movement is concerned.

It is obvious that because of the bendable material of which the key is formed, the latter may be easily lifted and straightened, thus permitting of the removal of the nut from the bolt.

Although I have shown and described the preferred embodiment of my invention, I desire to be understood that I am not to be limited to the exact details shown. However, great stress is laid upon the arrangement of the locking element or key associated with the bolt and coöperating with the threads thereon for permitting of the reception of the nut, the key being so arranged as to securely lock the nut on the bolt and prevent accidental displacement of the nut from the bolt.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:

The combination with a bolt having a longitudinal groove therein, the sides of the groove slanting toward the bottom thereof, of a locking key disposed in the groove, the lower front face of the key being provided with a plurality of threads of a pitch similar to the pitch of the threads on the bolt, the sides of the locking key slanting toward the rear face so as to conform to and frictionally engage the side walls of the groove and maintain the threads on the key in alinement with the threads on the bolt, a nut arranged on the bolt about the key, to engage and lock the nut on the bolt.

In testimony whereof I affix my signature in presence of two witnesses.

CHARLES P. ROBINSON.

Witnesses:
L. WIEDENBECK,
GEO. W. HILL.